(12) United States Patent
Zeug et al.

(10) Patent No.: US 10,434,582 B2
(45) Date of Patent: Oct. 8, 2019

(54) TOOL COUPLING BETWEEN TWO COUPLING PARTS, AND COUPLING PART FOR SUCH A TOOL COUPLING

(71) Applicant: Kennametal Inc., Latrobe, PA (US)

(72) Inventors: Berthold Heinrich Zeug, Fürth (DE); Jürgen Schwägerl, Vohenstrauss (DE); Horst Manfred Jäger, Nürnberg (DE)

(73) Assignee: KENNAMETAL INC., Latrobe, PA (US)

(*) Notice: Subject to any disclaimer, the term of this patent is extended or adjusted under 35 U.S.C. 154(b) by 92 days.

(21) Appl. No.: 15/331,633

(22) Filed: Oct. 21, 2016

(65) Prior Publication Data

US 2017/0113282 A1   Apr. 27, 2017

(30) Foreign Application Priority Data

Oct. 23, 2015  (DE) ...................... 10 2015 220 7773

(51) Int. Cl.
*B23B 51/02*  (2006.01)

(52) U.S. Cl.
CPC .......... *B23B 51/02* (2013.01); *B23B 2251/02* (2013.01); *B23C 2210/02* (2013.01); *Y10T 408/9098* (2015.01); *Y10T 408/90987* (2015.01)

(58) Field of Classification Search
CPC ......... B23C 2210/02; Y10T 408/90987; Y10T 408/9098; B23B 2251/02
See application file for complete search history.

(56) References Cited

U.S. PATENT DOCUMENTS

| | | | | |
|---|---|---|---|---|
| 6,012,881 A | * | 1/2000 | Scheer | B23B 31/008 408/145 |
| 6,109,841 A | * | 8/2000 | Johne | B23B 51/00 408/144 |

(Continued)

FOREIGN PATENT DOCUMENTS

| | | | | |
|---|---|---|---|---|
| CN | 100994527 A | | 8/2017 | |
| DE | 102012212146 A1 | | 1/2014 | |
| JP | 2004255533 A | * | 9/2004 | B23B 51/00 |

OTHER PUBLICATIONS

Description JP2004255533 (translation) obtained at https://worldwide.espacenet.com/ (last visited Jan. 24, 2019).*
Sep. 11, 2016 First office action P15-06059-DE-NP.

*Primary Examiner* — Ryan C Rufo
(74) *Attorney, Agent, or Firm* — Ian K. Samways

(57) ABSTRACT

A tool coupling used for a clamping connection between two coupling parts, in particular between a cutting head and a carrier of a rotary tool, in particular of a drill. The coupling parts comprise clamping sections, which respectively correspond to one another and which can be clamped against each other by turning counter to a predefined direction of rotation about an axis of rotation so that a press fit is produced. In order to produce a high clamping force and at the same time allow for a simple installation via screwing in, each clamping section comprises several successive clamping surfaces which—with respect to a cross section viewed orthogonally to the axial direction—respectively travel along a circular arc, wherein the diameter increases for clamping surfaces succeeding one another in the direction of rotation.

20 Claims, 2 Drawing Sheets

(56) References Cited

U.S. PATENT DOCUMENTS

| | | | | |
|---|---|---|---|---|
| 2003/0219321 | A1* | 11/2003 | Borschert | B23B 51/02 408/230 |
| 2005/0260046 | A1* | 11/2005 | Hecht | B23B 51/00 408/31 |
| 2006/0072976 | A1* | 4/2006 | Frota de Souza | B23B 51/00 408/230 |
| 2008/0193237 | A1* | 8/2008 | Men | B23B 51/02 408/226 |
| 2008/0193238 | A1* | 8/2008 | Hecht | B23B 51/02 408/230 |
| 2009/0116920 | A1* | 5/2009 | Bae | B23B 51/02 408/227 |
| 2010/0143059 | A1* | 6/2010 | Hecht | B23B 51/02 408/200 |
| 2010/0266357 | A1* | 10/2010 | Kretzschmann | B23B 51/02 408/204 |
| 2012/0003056 | A1* | 1/2012 | Jaeger | B23B 51/02 408/200 |
| 2012/0121347 | A1* | 5/2012 | Osawa | B23B 51/02 408/57 |
| 2013/0183112 | A1* | 7/2013 | Schwagerl | B23B 51/02 408/226 |
| 2013/0266389 | A1* | 10/2013 | Hecht | B23B 51/02 408/229 |
| 2014/0017022 | A1* | 1/2014 | Schwaegerl | B23B 51/00 408/231 |
| 2014/0169892 | A1* | 6/2014 | Hecht | B23C 5/006 407/42 |

* cited by examiner

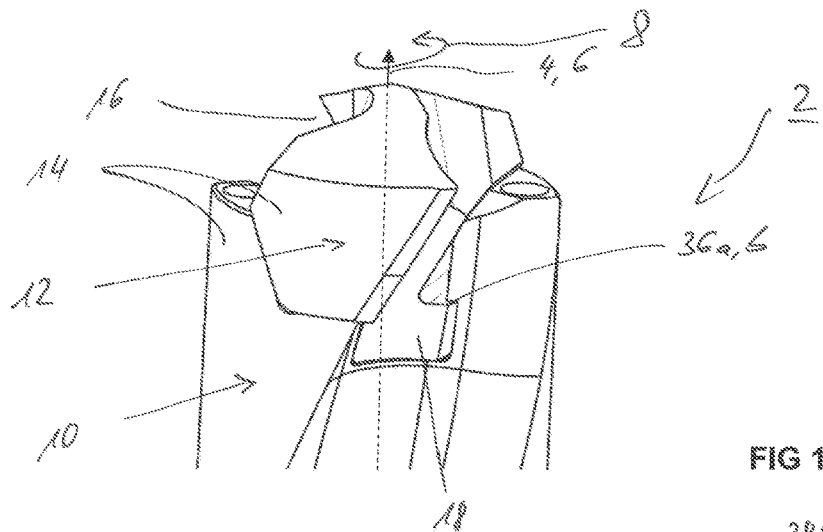
FIG 1
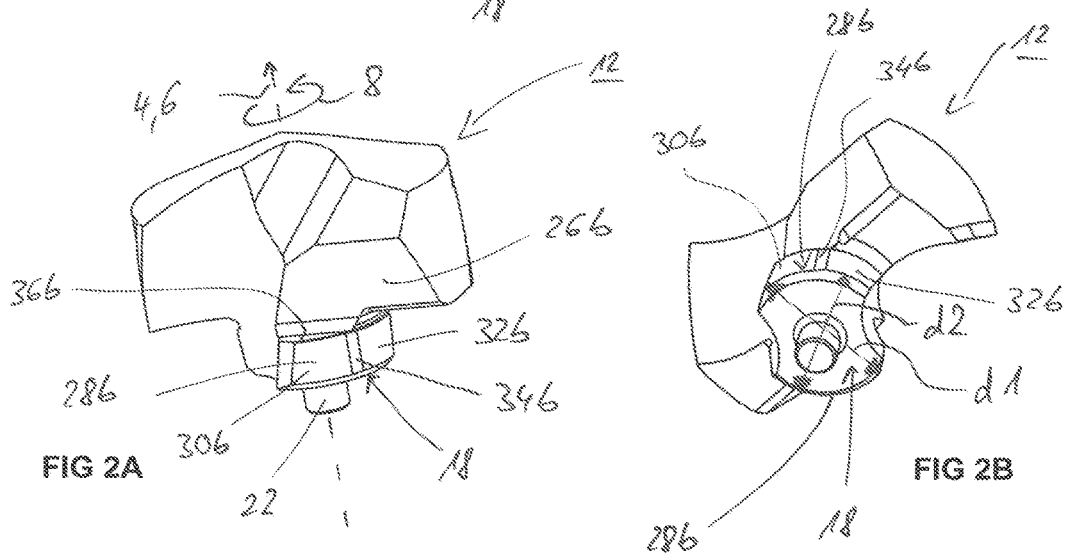
FIG 2A
FIG 2B
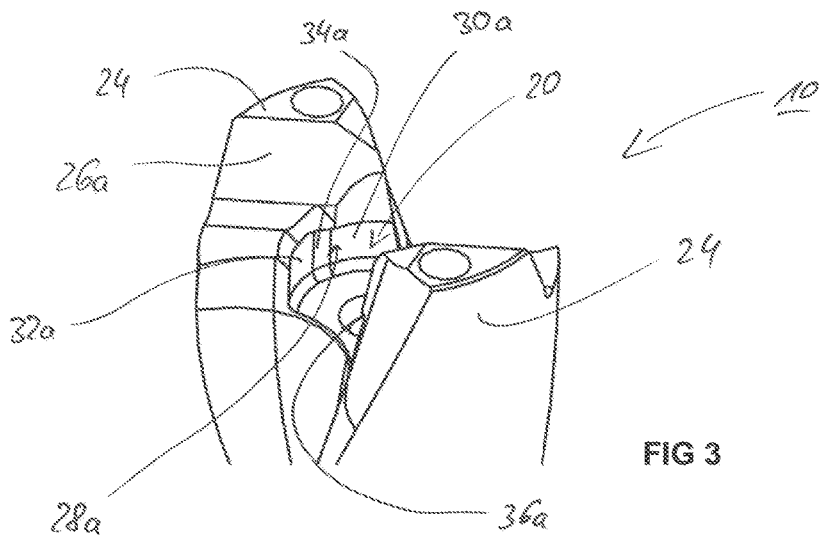
FIG 3

TOOL COUPLING BETWEEN TWO COUPLING PARTS, AND COUPLING PART FOR SUCH A TOOL COUPLING

CROSS-REFERENCE TO RELATED APPLICATION

This patent application claims priority under 35 U.S.C. § 119(a) to German Patent Application Number DE1020152207773, filed on Oct. 23, 2015, which is incorporated herein by reference in its entirety.

BACKGROUND

The invention relates to a tool coupling between two coupling parts, in particular between a cutting head and a carrier of a rotary tool with the features of the preamble of claim 1. The invention further relates to a coupling part for such a tool coupling.

A tool coupling of this type can be gleaned from EP 1 476 269 B1, for example. A rotary tool is described therein as a drill, which is designed as what is known as a modular rotary tool. This rotary tool extends in an axial direction along an axis of rotation and comprises two coupling parts, namely a carrier and a cutting head that is attached to the carrier so as to be interchangeable. For this purpose, the carrier usually comprises on its end surface two opposite fastening webs which are separated from each other by way of chip flutes and by way of which a pin receptacle is delimited. A coupling pin of the cutting head is inserted into this pin receptacle. This is carried out by rotating the cutting head around the axis of rotation relative to the carrier. During this rotation, a clamping connection is formed between clamping sections of the cutting head that correspond to one another and the carrier, so that the two coupling parts are preferably exclusively held together in a clamping manner. Preferably, no additional fastening media, such as screws or the like, are therefore typically arranged there.

In the tool coupling found in EP 1 476 269 B1, the pin receptacle has a circular cross section, and the coupling pin has a slightly elliptical cross section. As a result of the elliptical cross section, when the coupling pin is inserted, it initially has some play in the pin receptacle. The coupling pin is usually inserted by introducing the coupling pin axially into the pin receptacle. During the subsequent turning of the cutting head, the coupling pin is clamped into the pin receptacle as a result of the elliptical cross section.

A reliable clamping can be achieved by way of the elliptical cross section. However, as a result of the elliptical cross section, only a linear type of contact is effected in forming the press fit. Furthermore, high dimensional stability is required since a defined clamping force is only reached at the intended final position.

SUMMARY

Proceeding from the above, the invention is based on an objective of providing a tool coupling, in particular for a modular rotary tool, which allows for a reliable force fit of the two coupling parts in (or with respect to) one another.

The objective is achieved according to the present invention by way of a tool coupling with the features of claim 1, and by way of a coupling part with the features of claim 13. Preferred developments are contained in the dependent claims. The advantages and preferred embodiments mentioned with regard to the tool coupling are also to be applied analogously to the coupling part.

A tool coupling is used for a clamping connection between two coupling parts, wherein the coupling parts are in particular a cutting head and a carrier of a rotary tool. Preferably, no additional fastening elements (such as screws, etc.) are provided. The rotary tool is what is known as a modular rotary tool, in particular a modular drill. The rotary tool is not limited to drills, however. In principle, all rotary tools—such as milling cutters, reamers, etc.—can be provided with such a tool coupling.

The rotary tool generally extends in an axial direction along an axis of rotation and rotates about the axis of rotation in a predefined direction of rotation during operation. The one coupling part, in particular the cutting head, comprises a clamping pin with a pair of clamping sections that are opposite each other on sides of the pin. Corresponding thereto, the second coupling part—in particular the carrier—comprises a pin receptacle with at least one pair of clamping sections that are opposite each other on sides of the receptacle. The clamping connection is formed by rotating the clamping pin in the pin receptacle counter to the predefined direction of rotation. The mutually corresponding clamping sections of the two coupling parts produce a press fit in the process.

Each of the clamping sections respectively comprises a plurality of successive clamping surfaces. Each clamping section is thus subdivided into several clamping surfaces which cover a defined, smaller angular range than the entire clamping section. In a cross section as viewed orthogonal to the axial direction, the clamping surfaces extend along a circular arc having a predefined diameter. The diameters of the successive clamping surfaces vary such that the diameter increases for clamping surfaces that succeed one another in the direction of rotation. The pair of opposite clamping sections therefore comprise at least two clamping surface pairs opposite each other, wherein the diameter of the clamping surface pairs increases in the direction of rotation. The clamping surfaces of the pin receptacle and of the coupling pin that are associated with each other therefore form several press fits per clamping section. Both the clamping surfaces of the clamping pin and those of the pin receptacle respectively travel along a circular arc in a cross section as viewed orthogonally to the axial direction.

The design of the clamping surface pairs with the different diameters results on the one hand in the coupling pin being able to be easily screwed into the pin receptacle. Namely, the press fit between clamping surfaces corresponding to one another does not need to be formed over the entire angular range of the clamping sections but only over the limited angular range of the respective clamping surface. For a tightening of the clamping pin in the pin receptacle, an increased force therefore need only be applied over a limited angular range. At the same time, as a result of the several clamping surface pairs of differing diameter, a press fit is achieved over a comparatively large angular range, namely the sum of the individual angular ranges of the successive clamping surfaces per clamping section. This design also has advantages when releasing the tool coupling, as the coupling pin needs only to be rotated over a comparatively short rotational path in the direction of rotation to release the restraint. Overall, this design therefore achieves a clamping coupling between two coupling parts with high clamping force and at the same time with easy installation.

By "press fit", what is presently generally understood is that coupling parts corresponding to one another have a certain oversize, meaning that the diameter of the clamping surfaces of the clamping pin has at least a slight oversize with respect to the diameter of the corresponding clamping surfaces of the pin receptacle. This oversize is typically in the range of a few 100ths of a millimeter. When the coupling pin is clamped into the pin receptacle, the clamping sections of the pin receptacle expand elastically to a certain degree.

Expediently, the clamping surfaces are partially cylindrical in design, therefore forming segments of a cylinder shell surface. The clamping surfaces thus travel in parallel to the axial direction. Such a design is particularly easily realized with regard to the production process, in particular via grinding. The partially cylindrical design of the clamping surfaces is understood to mean that the clamping surfaces travel along a circular arc in a cross section as viewed orthogonally in the axial direction.

As an alternative thereto, for example, the coupling pin can be conical so that the clamping surfaces are inclined with respect to the axial direction. In this case, either a design with a cone that is increasing, or a design with a cone that is decreasing in the axial direction, is possible. In the case of a cone decreasing in the axial direction, the pin widens in the direction toward a bottom of the pin receptacle so that a positive locking is produced which is effective in the axial direction and which, at the same time, prevents a pulling-out of the two coupling parts in the axial direction. In this case, the coupling connection is designed in the manner of a dovetail connection.

According to an expedient design, each clamping section comprises more than two (particularly, three to five) clamping surfaces with different diameters. The diameter of the individual clamping surfaces continuously increases in the direction of rotation. Therefore, this means that—with respect to the screwing of the clamping pin into the pin receptacle—the leading clamping surface respectively has a smaller diameter than the directly following clamping surface.

Preferably, the successive clamping surfaces with the different diameters respectively extend over the same angle. In this way, the result is that all clamping surfaces corresponding to one another at least substantially engage with one another at the same time. The successive clamping surfaces preferably extend identically over the same angle. However, the same angle is understood to also include deviations of +/−15% and in particular of at most +/−10%.

The clamping surfaces preferably respectively cover an angle in the range of at least 10°, and preferably in the range of 35° to 45°. In a tool coupling of a modular rotary tool in which the pin receptacle is formed by two fastening webs separated from one another by flutes, the clamping sections respectively have an extent of approximately 70°. The large angular ranges of the clamping surface of 35° or more are achieved in this case when two clamping surfaces are formed per clamping section. With a larger number of clamping surfaces, for example three clamping surfaces, the angular range is correspondingly smaller and is then in the range of approximately 20° to 25°, for example. With two or even more than two clamping surfaces per clamping section, all clamping surfaces preferably have the same angular section so that they are thus equally distributed.

The difference of the diameters of two successive clamping surfaces is expediently smaller than 0.2 mm, and in particular is smaller than or equal to 0.1 mm. In particular, the difference in diameters is in the range of 0.04 mm to 0.1 mm. Typically, the minimum difference in diameters is 0.02 mm.

In a preferred design, a transition region is formed between two clamping surfaces that follow each other in the circumferential direction, in which transition region the two coupling parts do not abut against each other and are spaced apart from each other in the radial direction, i.e. have a radial clearance. In the transition region, a press fit is therefore not produced.

Expediently, each transition region is designed as a curved surface. Furthermore, the transition regions of the two coupling parts are expediently curved in opposing directions, whereby overall an approximately elliptical free space is formed in which the two surface sections of the coupling parts that correspond to one another are spaced apart from each other.

With regard to the production process, the two coupling parts are produced by a grinding or machining process. The outer contour of the coupling pin is in particular ground, wherein a grinding wheel is typically used. Conversely, the pin receptacle is formed by way of a machining tool, in particular a milling cutter. The radii of curvature of the curved transition regions correspond to the radii of the tools used, i.e. in particular either of the milling cutter or of the grinding wheel. These transition regions therefore result during the formation of the pin receptacle or the clamping pin as a consequence of the fact that different diameters are set for the different clamping surface pairs.

The transition region respectively extends over a transition angle which is in the range of 5° to 30°, and particularly is less than 20°.

As already mentioned, the coupling parts are designed on the one hand as a cutting head and on the other hand as a carrier of a modular carrier tool, such as a drill or milling cutter.

The carrier comprises on its end surface side two opposing fastening webs which form the pin receptacle. Furthermore, on the fastening webs there are torque sections formed, against which the cutting head abuts with associated torque sections in order to transmit torque. According to a first design variant, the torque sections extend up to an outermost circumference of the rotary tool, i.e. up to what is known as a rear drill surface. As an alternative thereto, the torque sections are formed on inner shell surfaces of the pin receptacle and on outer shell sections of the clamping or coupling pin. In this case, the torque surfaces are therefore enclosed by the fastening webs and do not extend to the outermost circumference.

BRIEF DESCRIPTION OF THE DRAWINGS

An exemplary embodiment of the invention is explained in greater detail below with reference to the figures. These show, partially in simplified depictions:

FIG. 1 is a lateral sectional view of a modular rotary tool designed as a drill, with a carrier and a cutting head inserted therein, FIGS. 2A, 2B show the cutting head according to FIG. 1 in different views, FIG. 3 shows the carrier according to FIG. 1, FIG. 4B is a simplified sectional depiction of the rotary tool along the section plane marked in FIG. 4A in the coupling region between a clamping pin and a pin receptacle, with the clamping pin only partially screwed in, FIG. 4C is a sectional depiction comparable to FIG. 4B, with the clamping pin completely screwed in.

Parts that function in the same manner bear the same reference numerals in the figures.

DETAILED DESCRIPTION

Figure 4A:
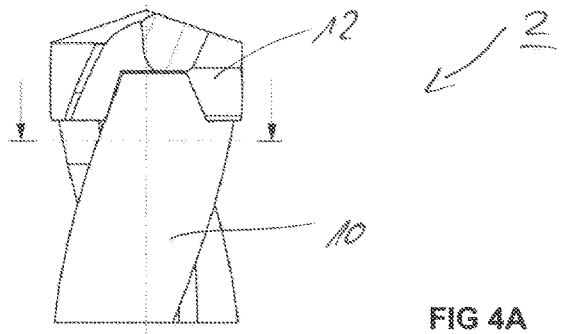
FIG. 4A is a simplified lateral depiction of the rotary tool according to FIG. 1.

The rotary tool 2 illustrated in the figures is designed as a modular drilling tool. It extends in an axial direction 4 along an axis of rotation 6. During normal operation, the rotary tool rotates about the axis of rotation 6 in the direction of rotation 8, which at the same time defines a circumferential direction. The rotary tool is composed of a carrier 10 and a cutting head 12 that is attached thereto so as to be interchangeable. The cutting head 12 comprises major cutting edges (which are not described in more detail) which are usually connected to one another in the center of a drill face via cross-cutting edges, and which extend radially outward. Counter to the direction of rotation 8, major flanks at the end surfaces adjoin the major cutting edges. On its circumferential side, the cutting head 12 comprises a rear surface 14 which is interrupted by opposing flutes 16. The flutes thus already start at the cutting head 12 and transition into the carrier 10. In an example embodiment, the flutes 16 extend approximately helically. The carrier 10 has a grooved shaft section at which, for example, minor cutting edges continue which extend along the flutes 16 and start at the cutting head 12. The grooved shaft section of the carrier 10 is usually also adjoined by a non-grooved clamping section with which the rotary tool 2 is clamped in a machine tool.

At the same time, the carrier 10 and the cutting head 12 define two coupling parts which are connected to each other via a tool coupling described in detail below.

To this end, the cutting head 12 comprises a clamping pin 18 which can be inserted in a clamping manner into a corresponding pin receptacle 20 of the carrier 10. In an example embodiment, the clamping pin 18 is designed as a circular disk-like element with likewise circular disk-shaped recesses that oppose one another. The recesses are determined by the flutes 16 which cut the clamping pin 18. In an example embodiment, the clamping pin 18 is furthermore adjoined by a lead-in pin 22 with which the cutting head 12 is pre-centered during inserting.

On the carrier 10, the pin receptacle 20 is formed by two opposing fastening webs 24 between which the clamping pin 18 is received. In order to insert the cutting head 12 into the carrier 10, the cutting head is initially introduced into the pin receptacle 20 from above in the axial direction, and the cutting head is subsequently turned counter to the direction of rotation 8 by approximately 90° so that it is held in the carrier 10 so as to be clamped and resist being pulled out.

During operation, the carrier 10 transmits the rotational movement—and thus a torque—to the cutting head 12. The cutting head 12 and the carrier 10 comprise several functional surfaces corresponding to one another for transmitting the torque on the one hand and for producing the desired press fit on the other hand. The surfaces corresponding to one another, which come to rest against one another in the inserted state, are designated below with the same reference symbols, wherein the surfaces of the carrier are designated with the letter a, and the surfaces of the cutting head are designated with the letter b.

As can be seen in FIGS. 1 and 3, the fastening webs 24 are more or less stepped, wherein the transition region of two planar step surfaces forms a torque surface 26a on the carrier side, against which torque surface a corresponding torque surface 26b of the cutting head comes to rest. The torque surfaces 26a,b are generally understood to be surfaces that are designed to transmit the torque during operation.

For the clamping fastening of the clamping pin 18 in the pin receptacle 20, clamping sections 28a,b are formed which respectively lie opposite one another in pairs. Flutes 16 are respectively formed between the opposite clamping sections 28a,b. As can be seen directly in FIGS. 2A,2B and FIG. 3, each clamping section 28a,b in an example embodiment respectively comprises two clamping surfaces 30a,b and 32a,b, between which a transition region 34a,b is formed. The clamping surfaces 30a,b; 32a,b are partially cylindrical shell surfaces, i.e. outer shell surfaces in the clamping pin 18 and inner shell surfaces in the pin receptacle 20. These shell surfaces extend parallel to the axial direction 4 and, when viewed in cross section relative to this, along a circular arc.

In order to prevent pulling-out (or pullout) in the axial direction, in an example embodiment, stop surfaces 36a,b corresponding to one another are additionally formed. In the clamping pin 18, these stop surfaces define an upper boundary surface of the clamping pin 18. They travel in particular at least approximately in the horizontal direction, and preferably precisely in the horizontal direction, i.e. orthogonally to the axial direction 4. In the carrier 10, an overhang is formed on each fastening web 24 to form the respective stop surface 36a. In the clamping pin 18, the stop surface 36b is directly adjoined by the torque surface 26b, which is designed in the exemplary embodiment to be diagonally inclined with respect to the axial direction 4. It is in particular designed as a ground surface. It extends in the direction of a front side end surface of the cutting head 12 and, at its end, tapers off freely, i.e., it is not covered at its end by a partial region of the cutting head, in particular not by the front side end surface. This allows for forming the stop surface 36b in a simple manner by grinding.

Figure 4B:
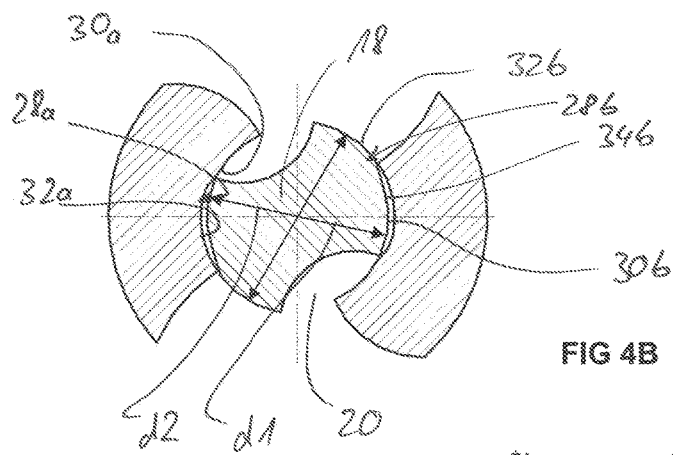

The design of the clamping sections 28a,b is explained in more detail below in connection with FIGS. 4A to 4B. For reasons of clarity, substantially only the reference symbols in connection with the clamping pin 18 are specified in the figures.

In FIGS. 4B to 4D, it can once again be seen that the respective clamping section 28b in the exemplary embodiment comprises two clamping surfaces 30b, 32b, which are separated from each other by a transition region 34b. As a result of the arrangement of the clamping sections 28b in pairs, the clamping surfaces 30b, 32b corresponding to one another are also arranged in pairs opposite one another. The clamping surface pair of the clamping surfaces 30b has a diameter d1, and the clamping surface pair of the clamping surfaces 32b has a diameter d2. The diameter d1 is slightly smaller than the diameter d2. The clamping surfaces 30b are leading clamping surfaces, and the clamping surfaces 32b are trailing or following clamping surfaces. This is understood to mean that the leading clamping surfaces 30b are arranged in a leading position during the screwing-in of the clamping pin 18 counter to the direction of rotation 8.

As a result of the smaller diameter d1, the clamping surfaces can therefore initially be screwed into the pin receptacle 20 with some play until they reach the clamping surfaces 30a of the pin receptacle 20 that are associated with them. The clamping surfaces 30b, 32b are therefore designed and arranged such that they reach their associated clamping surfaces 30a, 32a of the pin receptacle 20 at the same rotational position of the clamping pin 18 in the pin receptacle 20. The individual associated clamping surfaces 30a,b; 32a,b therefore come to engage with one another at the same time to produce the force fit or press fit. For this purpose, it is in particular provided that the individual clamping surfaces 30b, 32b extend over the same angle $\alpha$. At the same time, the transition region 34b extends over a transition angle $\beta$. In the exemplary embodiment, the angle $\alpha$ is in the range of 30° to 45° and in particular in the range between 35° and 40°. At the same time, the transition angle $\beta$ is preferably in the range of 5° to 20° and in particular in the range of approximately 10° to 15°. Overall, the respective clamping section 28b extends over an angular range of $2\alpha+\beta$ and, for example, is in the range between 80° and 110°, preferably approximately 95° to 105°.

The clamping surfaces 30a, 32a of the pin receptacle 20 are also designed to correspond to the clamping surfaces 30b, 32b of the clamping pin 18. These clamping surfaces 30a, 32a preferably extend over the same angle α as do the clamping surfaces 30b, 32b. The transition angle β is also preferably identical or at least similar to that of the clamping pin 18.

With regard to the desired press fit between the clamping surfaces 28a,b associated with one another, the clamping sections 28b have a slight oversize with respect to the clamping sections 28a of the pin receptacle 20. This means that the clamping surfaces 30a, 32a of the pin receptacle 20 have diameters that are respectively slightly less than the diameters d1, d2 of the clamping pin 18. The oversize is typically a few 1/100 mm.

Figure 4C:
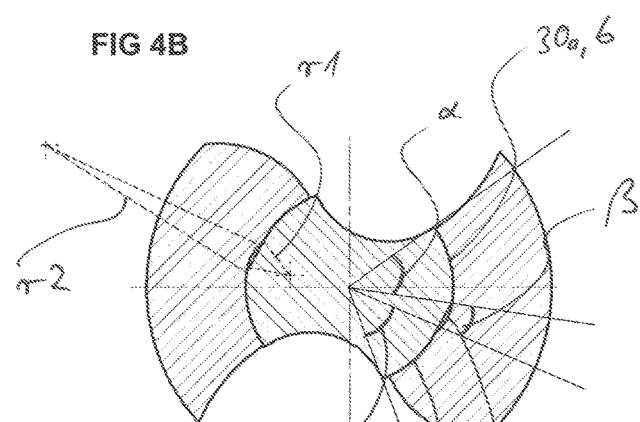
Figure 4D:
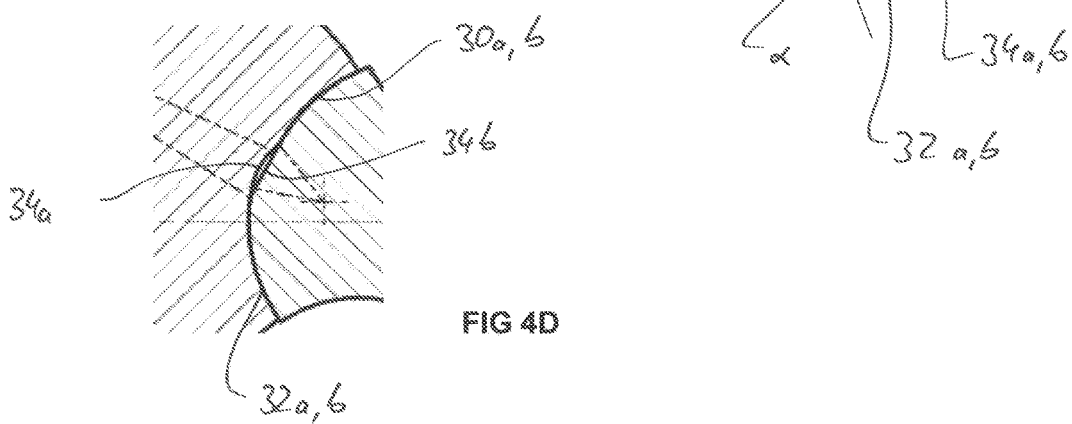
FIG. 4D is an enlarged sectional depiction from FIG. 4C.

As can be seen in particular in FIGS. 4C and 4D, a free space, i.e. a radial play, is formed in the transition region 34a,b between the surface sections corresponding to one another of the clamping pin 18 and the pin receptacle 20. With regard to the production process, the clamping sections 28a,b of the carrier 10 are formed by way of a milling cutter, and of the clamping pin 18 are formed by way of a grinding wheel. As a result of the different diameters d1, d2, the respective tool (grinding wheel or milling cutter) must be shifted somewhat in the radial direction so that the transition region 34a,b is formed. Accordingly, the transition regions 34a,b are defined by curved lines, wherein the radius of curvature respectively corresponds to the radius of the tool used, i.e. of the grinding wheel on the one hand and of the milling cutter on the other hand. These radii are drawn in FIG. 4C as radius r1 for the milling cutter and as radius r2 for the grinding wheel.

Overall, the design of the clamping sections 28a,b with several partially cylindrical clamping surfaces 30a,b; 32a,b achieves on the one hand an easy screwing of the clamping pin 18 into the pin receptacle 20. Since—as a result of the differences in diameter—the clamping pin 18 can initially be screwed into the pin receptacle virtually without force, an increased force need only be exerted over a limited angular range to produce the press fit. On the other hand, only a minor rotational movement is required during releasing in order to subsequently further unscrew the cutting head 12, largely without force.

The partially cylindrical design furthermore achieves the particular advantage that the requirements for the fit and tolerance precision of the two coupling parts 10,12, in particular with regard to a defined final position, are comparatively tolerant since no precise relative rotational positioning of the two coupling parts 10,12 to one another is required. Namely, a certain turning with respect to an intended position does not yet result in an abrupt reduction in the clamping force.

Furthermore, the partially cylindrical design, i.e. at least the design according to which the clamping surfaces 30a,b; 32a,b extend along circular arcs when viewed in cross section, achieves a largely laminar (surface to surface) contact between the coupling partners so that overall, a very high clamping force is achieved.

The concept introduced here, with several clamping surfaces running along a circular arc per clamping section, is alternatively also implemented in clamping pins 18 with clamping surfaces diagonally inclined with respect to the axial direction, i.e. for example in a clamping pin 18 designed in the manner of a dovetail.

The tool coupling has been described in the present document in connection with a rotary tool 2, but is not limited thereto. The design of the tool coupling may in principle also be used for other tools in which two coupling parts are connected to each other in a clamping manner by reciprocal turning about an axis of rotation 6.

Basically, the possibility also exists of the pin receptacle 20 forming a completely circumferential pin receptacle 20—unlike in the example embodiments shown—so that the clamping pin 18 is therefore enclosed 360° by the pin receptacle 20. In particular, if such "completely enclosed" pins are assumed, then more than two successive clamping surfaces 30a,b; 32a,b are provided. In such completely enclosed design variants, measures merely have to be taken to allow for an initial insertion of the clamping pin 18 into the pin receptacle 20.

What is claimed is:

1. A coupling between two coupling parts of a rotary tool, wherein the coupling parts each extend in an axial direction and the rotary tool has a predefined direction of rotation about an axis of rotation, wherein:
   a first one of the coupling parts comprises a clamping pin having a pair of clamping sections;
   the clamping sections being disposed opposite one another at sides of the clamping pin;
   a second one of the coupling parts comprises a pin receptacle having a pair of clamping sections;
   the clamping sections of the second coupling part being disposed opposite one another at sides of the pin receptacle;
   wherein, for each of the first and second coupling parts:
      each of the clamping sections comprises clamping surfaces;
      each of the clamping surfaces extends along and is shaped as a circular arc when viewed in cross section orthogonally to the axial direction;
      the clamping surfaces are arranged in at least two clamping surface pairs disposed opposite one another, with respect to the axis of rotation;
      for each of the at least two clamping surface pairs, the circular arcs of the clamping surfaces define a constant, predefined diameter as measured through the axis of rotation;
      with respect to the predefined direction of rotation, the diameter increases from one of the at least two clamping surface pairs to a successive one of the at least two clamping surface pairs; and
   the clamping sections each comprise one clamping surface of each of the at least two clamping surface pairs;
   wherein in each respective clamping section the successive one of the at least two clamping surface pairs is a leading surface in the predefined direction of rotation.

2. The tool coupling according to claim 1 wherein, upon turning the clamping pin counter to the direction of rotation about the axis of rotation, the clamping pin is clamped into the pin receptacle via a press fit between the clamping sections of the clamping pin and the clamping sections of the pin receptacle.

3. The tool coupling according to claim 1, wherein:
   the first coupling part comprises a cutting head of the rotary tool; and
   the second coupling part comprises a carrier of the rotary tool.

4. The tool coupling according to claim 3, wherein the rotary tool comprises a modular rotary tool.

5. The tool coupling according to claim 4, wherein the modular rotary tool comprises a drill.

6. The tool coupling according to claim 3, wherein:
the carrier comprises two opposing fastening webs which define the pin receptacle;
the carrier comprising torque surfaces formed on the fastening webs;
the cutting head comprising torque surfaces which are compatible with, and rest against, the torque surfaces of the carrier;
wherein the torque surfaces of the carrier and of the cutting head interact with each other to transmit a torque between the carrier and the cutting head.

7. The tool coupling according to claim 1, wherein the clamping surfaces of the first coupling part and the clamping surfaces of the second coupling part are each partially cylindrical in shape.

8. The tool coupling according to claim 1, wherein each of the clamping surfaces extends over an identical angle, when viewed in cross section orthogonally to the axial direction.

9. The tool coupling according to claim 1, wherein each of the clamping surfaces extends in a circumferential direction over an angle of at least 10 degrees, when viewed in cross section orthogonally to the axial direction.

10. The tool coupling according to claim 9, wherein each of the clamping surfaces extends in the circumferential direction over an angle in the range of 35 degrees to 45 degrees, when viewed in cross section orthogonally to the axial direction.

11. The tool coupling according to claim 1, wherein a difference between diameters of two consecutive clamping surface pairs is smaller than 0.2 mm.

12. The tool coupling according to claim 11, wherein the difference between diameters of the two consecutive clamping surface pairs is in the range of 0.04 mm to 0.1 mm.

13. The tool coupling according to claim 1, wherein:
each of the clamping sections of each of the first and second coupling parts comprises a transition region formed between consecutive ones of the clamping surfaces;
wherein, at the transition regions, the first and second coupling parts are spaced apart from each other.

14. The tool coupling according to claim 13, wherein each of the transition regions comprises a curved surface.

15. The tool coupling according to claim 14, wherein each of the transition regions in the first coupling part is curved in an opposite direction with respect to the transition regions in the second coupling part.

16. The tool coupling according to claim 13, wherein each of the transition regions extends in a circumferential direction over an angle in the range of 5 degrees to 30 degrees, when viewed in cross section orthogonally to the axial direction.

17. The tool coupling according to claim 13, wherein, for each of the clamping sections of each of the first and second coupling parts:
the transition region extends in the circumferential direction over a first angle, when viewed in cross section orthogonally to the axial direction; and
the first angle is less than an angle over which at least one clamping surface adjacent to the transition region extends in the circumferential direction, when viewed in cross section orthogonally to the axial direction.

18. The tool coupling according to claim 17 wherein, for each of the clamping sections of each of the first and second coupling parts:
each clamping surface adjacent to the transition region extends over an angle which is greater than the first angle.

19. A cutting head for a rotary tool, wherein the cutting head extends in an axial direction and has a predefined direction of rotation about an axis of rotation, the cutting head comprising:
a clamping pin having a pair of clamping sections;
the clamping sections being disposed opposite one another at sides of the clamping pin;
wherein each of the clamping sections comprises clamping surfaces;
each of the clamping surfaces extends along and is shaped as a circular arc when viewed in cross section orthogonally to the axial direction;
the clamping surfaces are arranged in at least two clamping surface pairs disposed opposite one another, with respect to the axis of rotation;
for each of the at least two clamping surface pairs, the circular arcs of the clamping surfaces define a constant, predefined diameter as measured through the axis of rotation;
with respect to the predefined direction of rotation, the diameter increases from one of the at least two clamping surface pairs to a successive one of the at least two clamping surface pairs; and
the clamping sections each comprise one clamping surface of each of the at least two clamping surface pairs;
wherein in each respective clamping section the successive one of the at least two clamping surface pairs is a leading surface in the predefined direction of rotation.

20. A carrier for a rotary tool, wherein the carrier extends in an axial direction and has a predefined direction of rotation about an axis of rotation, the carrier comprising:
a pin receptacle having a pair of clamping sections;
the clamping sections being disposed opposite one another at sides of the clamping pin;
wherein each of the clamping sections comprises clamping surfaces;
each of the clamping surfaces extends along and is shaped as a circular arc when viewed in cross section orthogonally to the axial direction;
the clamping surfaces are arranged in at least two clamping surface pairs disposed opposite one another, with respect to the axis of rotation;
for each of the at least two clamping surface pairs, the circular arcs of the clamping surfaces define a constant, predefined diameter as measured through the axis of rotation; and
with respect to the predefined direction of rotation, the diameter increases from one of the at least two clamping surface pairs to a successive one of the at least two clamping surface pairs; and
the clamping sections each comprise one clamping surface of each of the at least two clamping surface pairs;
wherein in each respective clamping section the successive one of the at least two clamping surface pairs is a leading surface in the predefined direction of rotation.

* * * * *